(12) United States Patent
Kashihara et al.

(10) Patent No.: US 7,012,351 B2
(45) Date of Patent: Mar. 14, 2006

(54) ALTERNATOR HAVING A STATOR CORE WITH INCLINED TEETH

(75) Inventors: Toshiaki Kashihara, Tokyo (JP); Shogo Okamoto, Tokyo (JP); Norihiro Murata, Tokyo (JP); Kensaku Kuroki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/100,494

(22) Filed: Apr. 7, 2005

(65) Prior Publication Data

US 2006/0033396 A1    Feb. 16, 2006

(30) Foreign Application Priority Data

Dec. 8, 2004   (JP) ............................. 2004-355512

(51) Int. Cl.
*H02K 1/00* (2006.01)
(52) U.S. Cl. ...................................... 310/216; 310/259
(58) Field of Classification Search .............. 310/68 D, 310/179, 215, 216–218, 58, 59, 254–260
See application file for complete search history.

(56) References Cited

U.S. PATENT DOCUMENTS

| | | | | |
|---|---|---|---|---|
| 4,780,636 A | * | 10/1988 | Gandhi et al. .............. | 310/216 |
| 6,091,169 A | * | 7/2000 | Umeda et al. ................. | 310/62 |
| 6,140,735 A | * | 10/2000 | Kato et al. ................... | 310/201 |
| 6,373,166 B1 | * | 4/2002 | Asao et al. .................. | 310/263 |
| 2003/0137213 A1 | * | 7/2003 | Oohashi et al. ............. | 310/263 |
| 2004/0140731 A1 | * | 7/2004 | Kometani et al. .......... | 310/263 |
| 2004/0251766 A1 | * | 12/2004 | Kometani et al. .......... | 310/216 |

FOREIGN PATENT DOCUMENTS

| | | |
|---|---|---|
| JP | 05-316677 A | 11/1993 |
| JP | 06-284618 A | 10/1994 |
| JP | 2001-298885 A | 10/2001 |
| JP | 2003-061319 A | 2/2003 |

* cited by examiner

*Primary Examiner*—Thanh Lam
(74) *Attorney, Agent, or Firm*—Sughrue Mion, PLLC

(57) ABSTRACT

An alternator includes a stator having a stator core in which a plurality of slots are formed so as to line up in a circumferential direction on an inner peripheral wall surface, and a stator winding configured such that conducting wires are installed in the slots; and a rotor rotatably disposed inside the stator, having a field winding, a pair of pole cores each having a plurality of claw-shaped magnetic poles that alternately intermesh with each other disposed so as to cover the field winding, and a fan disposed on an axial end surface of at least one of the pole cores, air flows together with rotation of the rotor in stepped portions between teeth partitioning the slots, and an inclined portion bent in a circumferential direction of the stator is formed on at least one of the teeth on at least one end portion among first and second axial end portions of the teeth.

5 Claims, 4 Drawing Sheets

ALTERNATOR HAVING A STATOR CORE WITH INCLINED TEETH

BACKGROUND OF THE INVENTION

1. Field of the Invention

The present invention relates to an alternator in which air flows in stepped portions between teeth partitioning slots together with rotation of a rotor.

2. Description of the Related Art

Conventionally, alternators having a stator in which a stator winding is installed in a stator core by winding conducting wires into slots of the stator core are known, and wedges may be disposed between teeth constituting entrance portions of each of the slots to prevent the conducting wires from dislodging from the slots.

In such cases, because stepped portions arise between surfaces of the teeth and inner peripheral surfaces of the wedges, fluctuations in air density occur at the stepped portions when a rotor disposed inside the stator rotates at high speed, giving rise to resonance effects, thereby generating wind noise having components in orders dependent on the number of stator teeth (number of slots) that can be felt as noise that is extremely unpleasant to human hearing.

Consequently, aiming to reduce this unpleasant noise in the high-speed rotation region, configurations in which wedges are formed so as to have a general bucket shape, and entrance portions of the slots are blocked by stepped protruding portions at central portions of the wedges, or configurations in which protruding portions are made into an integrated resin molding shaped such that tip widths of the protruding portions have an interference relative to a width of the entrance portions of the slots to firmly fix them to the entrance portions of the slots are known. (See Patent Literature 1, for example.)

However, in such configurations, precision and accuracy must be ensured during production of the protruding portions of the wedges, and there have been problems such as a risk that the wedges may project beyond the inner peripheral surfaces of the stator and rub against the rotor if their height is incorrect, etc.

In answer to this, configurations are known in which the stepped portions on the inner periphery of the stator are made less likely to act as resonance tubes and unpleasant noise is reduced by forming irregular portions or penetrating apertures on or in surfaces of the wedges such that even if rarefaction and compression of the air occurs at the stepped portions when the rotor rotates at high speed inside the inner peripheral surfaces of the stator, the air is reflected diffusely by the irregular portions or penetrating apertures formed on or in the surfaces of the wedges. (See Patent Literature 2, for example.)

Patent Literature 1
 Japanese Patent Laid-Open No. SHO 60-170435 (Gazette)

Patent Literature 2
 Japanese Patent Laid-Open No. HEI 6-284618 (Gazette)

However, in the configuration of Patent Literature 2, because the stepped portions still exist between the surfaces of the teeth and the inner peripheral surfaces of the wedges, and moreover the stepped portions exist so as to extend parallel to each other in an axial direction so as to be at a uniform pitch in a circumferential direction, one problem has been that the stepped portions still give rise to resonance effects, and are inclined to generate wind noise having components in orders dependent on the number of stator teeth (number of slots), and the frequencies of the unbalanced wind noise, being in a proportional relationship with the rotational frequency of the rotor as well as with the number of slots, are in frequency regions that are unpleasant to human hearing in the high-speed rotation region of the rotor.

Although conventionally the number of slots in alternators has been thirty-six, in recent years the number of slots has increased to seventy-two, ninety-six, etc., due to demand for compactness and high output, and one problem has been that unpleasant noise can now be sensed even when the rotor is at normal rotational speeds.

SUMMARY OF THE INVENTION

The present invention aims to solve the above problems and an object of the present invention is to provide an alternator enabling unpleasant noise to be reduced by reducing levels of wind noise having components in orders dependent on the number of slots.

In order to achieve the above object, according to one aspect of the present invention, there is provided an alternator in which an inclined portion bent in a circumferential direction of a stator is formed on at least one tooth on at least one end portion among first and second axial end portions of teeth.

Using an alternator according to the present invention, noise levels of components in orders dependent on the number of slots is reduced and unpleasant noise can be reduced.

DETAILED DESCRIPTION OF THE PREFERRED EMBODIMENT

A preferred embodiment of the present invention will now be explained, and identical or corresponding members and portions will be given identical numbering.

Embodiment 1

Figure 1:
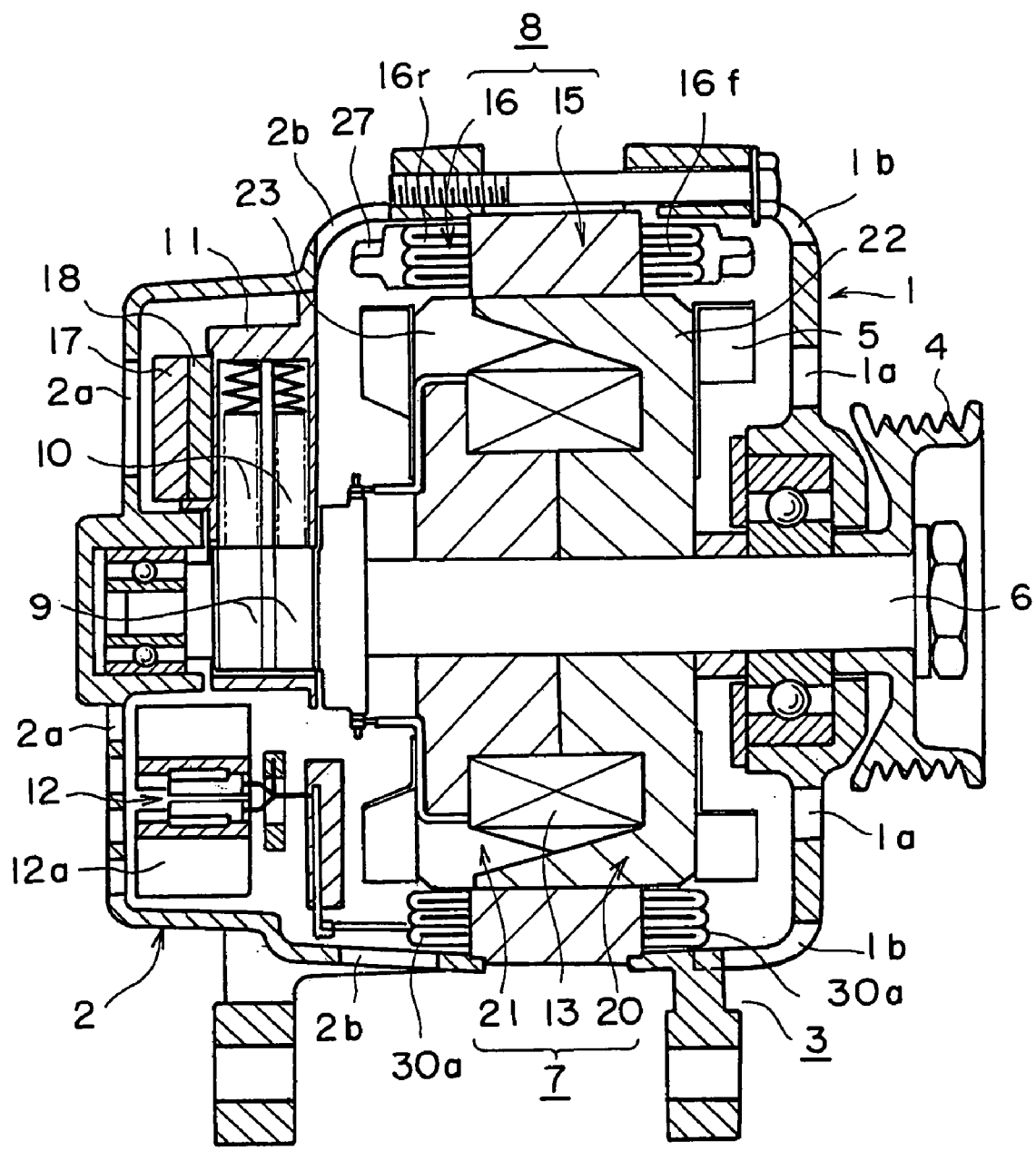
FIG. 1 is a longitudinal section showing an automotive alternator according to Embodiment 1 of the present invention.
Figure 2:
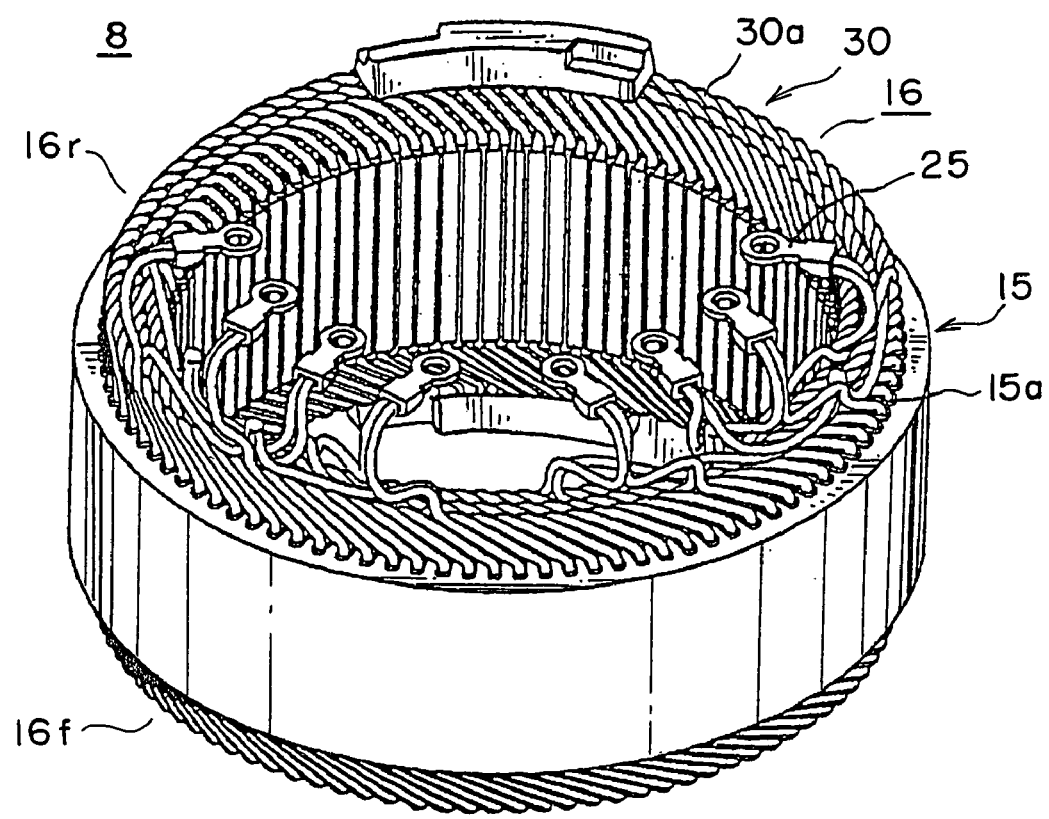
FIG. 2 is a perspective of a stator used in the automotive alternator according to Embodiment 1 of the present invention viewed from a rear end.

FIG. 1 is a longitudinal section showing an automotive alternator according to Embodiment 1 of the present invention, and FIG. 2 is a perspective of a stator 8 from FIG. 1 viewed from a rear end.

In this automotive alternator, a shaft 6 is rotatably disposed inside a case 3 constituted by a front bracket 1 and a rear bracket 2 made of aluminum, a pulley 4 being fixed to a first end portion of the shaft 6. A Lundell-type rotor 7 is fixed to the shaft 6. Fans 5 functioning as a cooling means are fixed to first and second axial end portions of the rotor 7.

A stator 8 is fixed to an inner wall of the case 3 so as to be held between the front bracket 1 and the rear bracket 2 and surround the rotor 7.

Slip rings 9 for supplying an electric current to the rotor 7 are fixed to a second end portion of the shaft 6. A pair of brushes 10 housed inside a brush holder 11 slide in contact with surfaces of the slip rings 9. A rectifier 12 for converting alternating current generated in the stator 8 into direct current is electrically connected to the stator 8. A heat sink 17 is fitted onto the brush holder 11. A regulator 18 for adjusting a magnitude of an alternating voltage generated in the stator 8 is mounted to the heat sink 17.

The rotor 7 includes: a field winding 13 for generating a magnetic flux on passage of an electric current; and a pair of first and second pole cores 20 and 21 disposed so as to cover the field winding 13, magnetic poles being formed in the first and second pole cores 20 and 21 by the magnetic flux from the field winding 13. The first and second pole cores 20 and 21 are made of iron, being configured so as to have eight first and eight second claw-shaped magnetic poles 22 and 23, respectively, each of the claw-shaped magnetic poles 22 and 23 having a generally trapezoidal outermost diameter surface shape disposed on an outer peripheral edge portion at a uniform angular pitch in a circumferential direction so as to project axially, and the first and second pole cores 20 and 21 being fixed to the shaft 6 facing each other such that the first and second claw-shaped magnetic poles 22 and 23 intermesh.

The stator 8 is constituted by: a cylindrical stator core 15; and a stator winding 16 installed in the stator core 15. A uniform air gap is formed between inner peripheral surfaces of the stator core 15 and outer peripheral surfaces of the claw-shaped magnetic poles 22 and 23.

Figure 3:
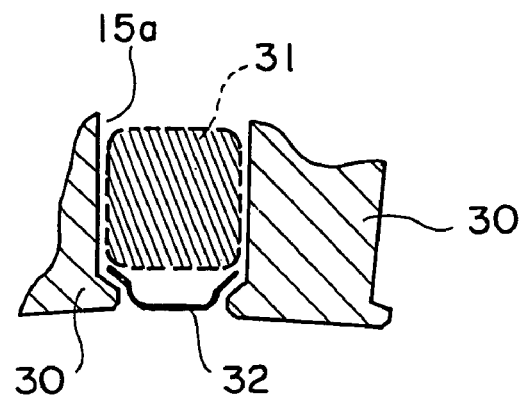
FIG. 3 is a partial enlarged cross section of the stator in FIG. 1.

As shown in FIG. 3, slots 15a extending in an axial direction partitioned by teeth 30 are formed in the stator core 15 at a ratio of two slots per phase per pole. Specifically, ninety-six slots 15a are arranged at a uniform pitch in a circumferential direction on an inner peripheral side of the stator core 15, the number of magnetic poles in the rotor 7 being sixteen. The stator winding 16 is configured by installing conductor wires 31 functioning as base strands in the stator core 15. These conductor wires 31 are formed by coating an electrically-insulating coating onto a conductor having a rectangular cross section.

A wedge 32 for preventing dislodgment of the stator winding 16 from the slots 15a is disposed on a radially innermost side of each of the slots 15a. Stepped portions exist between the teeth 30 and the wedges 32. These stepped portions exist so as to extend parallel to each other in an axial direction at a uniform pitch in a circumferential direction.

Figure 4:
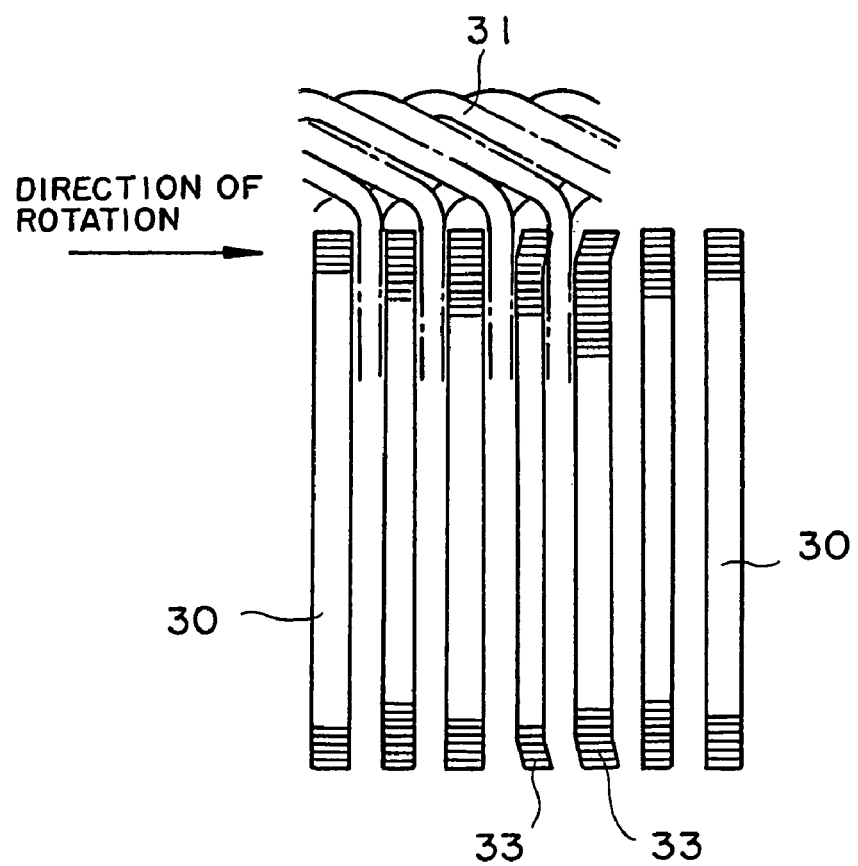
FIG. 4 is a diagram of an inner side of the stator when viewed from an axis of a rotor from FIG. 1.

FIG. 4 is a diagram of an inner side of the stator 8 when viewed from an axis of the rotor 7, showing that inclined portions 33 bent in a direction identical to that of the direction of rotation of the rotor 7 are formed on two end portions of some of the teeth 30 at a nonuniform pitch in a circumferential direction of the stator 8.

In an automotive alternator configured in this manner, an electric current is supplied to the field winding 13 from a battery (not shown) by means of the brushes 10 and the slip rings 9, generating a magnetic flux. The first claw-shaped magnetic poles 22 in the first pole core 20 are magnetized into North-seeking (N) poles by this magnetic flux, and the second claw-shaped magnetic poles 23 in the second pole core 21 are magnetized into South-seeking (S) poles. At the same time, rotational torque from an engine is transmitted to the shaft 6 by means of a belt (not shown) and the pulley 4, rotating the rotor 7. Thus, a rotating magnetic field is imparted to the stator winding 16, generating an electromotive force in the stator winding 16. This alternating-current electromotive force passes through the rectifier 12 and is converted into a direct current, and the magnitude thereof is adjusted by the regulator 18, charging the battery.

At a rear end, external air is drawn in due to rotation of the fans 5 through rear-end air intake apertures 2a disposed opposite a heat sink on the rectifier 12 and the heat sink 17 of the regulator 18, etc., flows along an axis of the shaft 6, cooling the rectifier 12 and the regulator 18, is then deflected centrifugally by the fans 5, cooling a rear-end coil end group 16r of the stator winding 16, and is discharged externally through rear-end air discharge apertures 2b. At the same time, at a front end, external air is drawn in axially through front-end air intake apertures 1a due to rotation of the fans 5, is then deflected centrifugally by the fans 5, cooling a front-end coil end group 16f of the stator winding 16, and is discharged externally through front-end air discharge apertures 1b.

Because a uniform air gap is formed between inner peripheral surfaces of the stator core 15 and outer peripheral surfaces of the claw-shaped magnetic poles 22 and 23, air flows in the air gap from the front end to the rear end, or from the rear end to the front end.

In an automotive alternator having the above configuration, air flows in the air gap from the front end to the rear end, or from the rear end to the front end, but because the inclined portions 33 are formed on first and second end portions of the teeth 30 at a nonuniform pitch in a circumferential direction of the stator 8, the flow passing through the stepped portions existing between the surfaces of the teeth 30 and the inner peripheral surfaces of the wedge 32 is nonuniform in the circumferential direction and the axial direction of the stator 8, suppressing wind noise having components in orders dependent on the number of slots 15a.

If the number of the slots 15a is ninety-six and the teeth do not have inclined portions 33 on either of the end portions, when the rotor 7 rotates in a normal service region at a rotational speed of 6,000 rpm (corresponding to a rotational speed of 2,400 rpm in the engine), components in orders dependent on the number of slots are generated mainly as high frequency sound of 6000/60×96=9600 Hz, whereby unpleasant high-frequency noise is heard even at normal rotational speeds.

In contrast to that, in this embodiment, which has a stator 8 in which the number of the slots 15a is ninety-six, the flow of air passing through the stepped portions is nonuniform in the circumferential direction and the axial direction of the stator 8 due to the effects of the inclined portions 33, and components in orders dependent on the number of the slots 15a are distributed from lower orders through to higher orders without being biased toward specific high frequency sounds, reducing the noise levels of unpleasant noise.

Because the inclined portions 33 are bent in a direction identical to that of the direction of rotation of the rotor 7, air resistance due to rotation of the rotor 7 is lowered, reducing the noise level proportionately.

Figure 5:
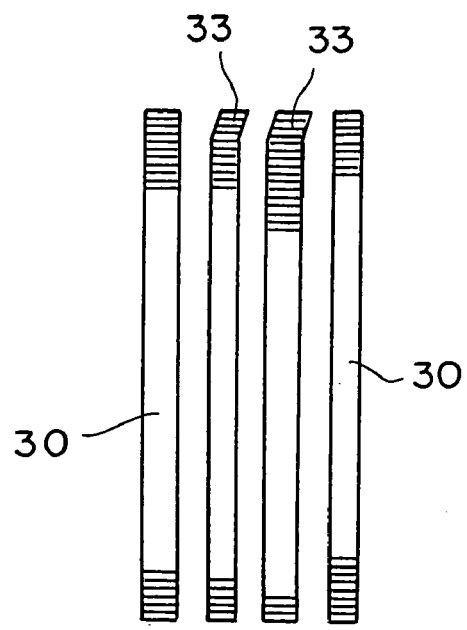
FIG. 5 is a diagram showing an example of deformation of teeth from FIG. 1.
Figure 6:
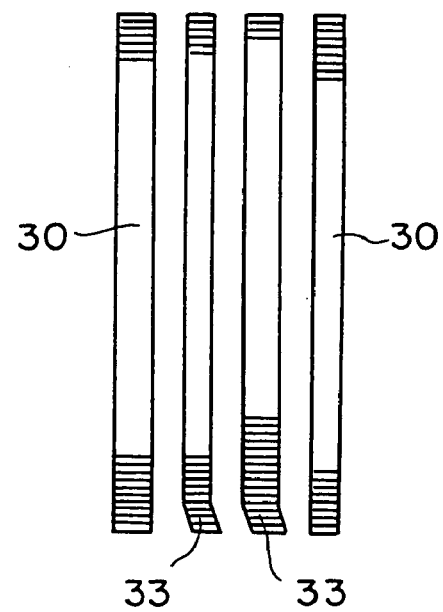
FIG. 6 is a diagram showing another example of deformation of the teeth from FIG. 1.

Moreover, in the above embodiment, inclined portions 33 are explained as being formed on two end portions of some of the teeth 30, but as shown in FIG. 5, the inclined portions 33 may also be formed on end portions of the teeth 30 only at the front end, or as shown in FIG. 6, the inclined portions 33 may also be formed on end portions of the teeth 30 only at the rear end.

If the inclined portions are formed on two end portions or one end portion of all of the teeth, the noise level of unpleasant noise is also reduced although the extent of dispersion of the components in orders dependent on the number of the slots 15a is small compared to the automotive alternator in the above embodiment, in which inclined portions were formed on some of the teeth 30 at a nonuniform pitch in a circumferential direction of the stator.

The present invention can also be applied to automotive alternators having a stator in which the number of slots is seventy-two.

In the above embodiment, the wedges 32 are flat, but they may be another shape such as having a dovetail-shaped cross section, etc. The present invention can also be applied to alternators in which wedges are made unnecessary by forming protrusions on radially-innermost portions of teeth to prevent a stator winding from dislodging.

The invention claimed is:

1. An alternator comprising:
   a stator having:
      a stator core comprising a plurality of teeth defining a plurality of slots extending in an axial direction so as to line up in a circumferential direction on an inner peripheral wall surface; and
      a stator winding configured such that conducting wires are installed in said slots; and
   a rotor rotatably disposed inside said stator, said rotor having:
      a field winding in which a magnetic flux arises on passage of an electric current;
      a pair of pole cores each having a plurality of claw-shaped magnetic poles that alternatively intermesh with each other disposed so as to cover said field winding; and
      a fan disposed on an axial end surface of at least one of said pole cores,
   air flowing together with rotation of said rotor in stepped portions between said teeth partitioning said slots,
   wherein:
   at least one of said teeth includes an inclined portion which is inclined in a circumferential direction with respect to a longitudinal axis of said teeth on at least one end portion among first and second axial end portions of said at least one of said teeth.

2. The alternator according to claim 1, further comprising:
a plurality of wedges for preventing dislodgment of said stator winding, wherein said wedges are disposed near a radially-innermost portion of said slots.

3. The alternator according to claim 1, wherein:
at least two of said teeth disposed at a nonuniform pitch in a circumferential direction of said stator include said inclined portion.

4. The alternator according to claim 1, wherein:
said inclined portion is inclined in a direction identical to that of a direction of rotation of said rotor.

5. The alternator according to claim 1, wherein:
the number of said slots is seventy-two or ninety-six.

* * * * *